C. I. E. MASTIN.
GASKET.
APPLICATION FILED AUG. 14, 1915.
1,203,762.
Patented Nov. 7, 1916.
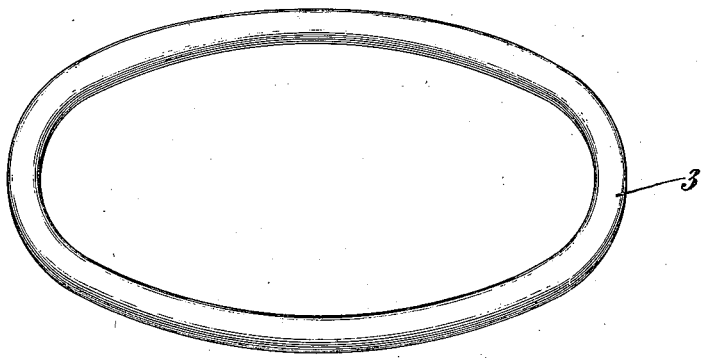
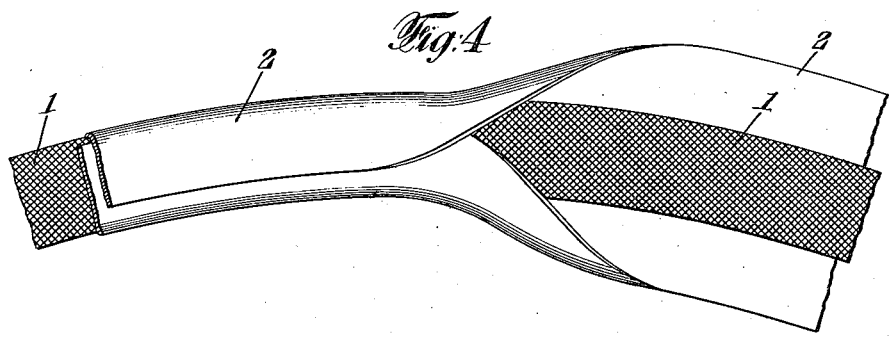
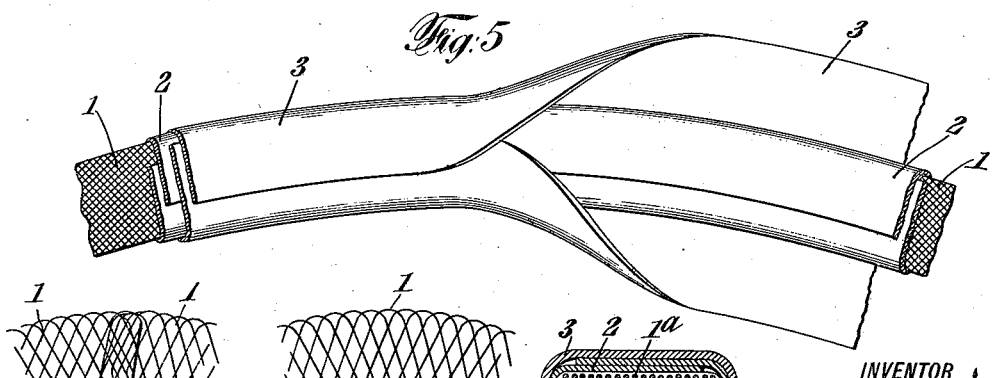
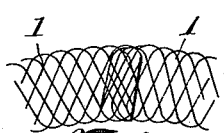
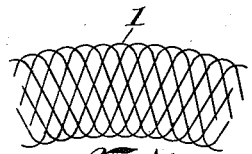
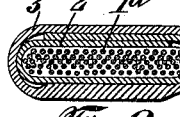
INVENTOR
Charles I. E. Mastin
BY
Davis & Davis
ATTORNEYS

UNITED STATES PATENT OFFICE.

CHARLES I. E. MASTIN, OF MIDLAND PARK, NEW JERSEY.

GASKET.

1,203,762.  Specification of Letters Patent.  Patented Nov. 7, 1916.

Application filed August 14, 1915. Serial No. 45,461.

*To all whom it may concern:*

Be it known that I, CHARLES I. E. MASTIN, a citizen of the United States, and resident of Midland Park, county of Bergen, and State of New Jersey, have invented certain new and useful Improvements in Gaskets, of which the following is a specification.

The object of this invention is to provide a gasket which, while possessing great flexibility and elasticity, will be strong and durable and of a character to withstand excessive heat and acid or oil.

Another object of the invention is to provide a flattened tubular wire gauze ring as a central core and reinforcement for the gasket.

In the drawings, Figure 1 is a perspective view of a gasket constructed in accordance with this invention; Fig. 2 a transverse sectional view thereof; Fig. 3 is a similar view showing a different form of metal reinforcement in the gasket; Fig. 4 a detail perspective view illustrating the method of placing the first wrapping around the reinforcing metal filler; Fig. 5 a similar view showing the method of applying the second or outer wrapper to the gasket; Fig. 6 a detail view showing the ends of the tubular reinforcing core telescoped, or one within the other; Fig. 7 a detail view of a portion of the wire core and reinforcement; and Fig. 8 a transverse sectional view showing a plurality of layers of wire gauze forming the reinforcing ring or core.

Referring to the various parts by numerals, 1 designates the central core or reinforcement. This reinforcing core is annular in form and may be made of any suitable flexible metal. As shown in Figs. 2 and 6 it consists of a ring formed of flattened tubular wire gauze with the ends of the strip of which the ring is made, telescoped one within the other, so that the strands at the ends of the strip become practically interwoven and the ring is thereby formed practically endless and of equal strength at all points. The wire gauze is loosely woven of the required diameter and is then flattened and made of the desired width. By employing a tubular gauze structure for the reinforcement there are no ends of the wire along the marginal edges of the reinforcement. This is desirable for the reason that the ends of the fine wire have a tendency to puncture and tear the enveloping fabric and rubber. This is entirely avoided by the use of a flat tubular wire gauze structure. Also there is no tendency of the two layers of the flat tubular structure to shift laterally on each other when the gasket is under pressure. I have also found that a reinforcing core made in the manner described gives greater strength than is secured by the use of two thicknesses of wire gauze laid one on the other. This enables me to form the gaskets thinner, and at the same time secure the desired strength. After the reinforcing ring is formed it is immersed in soft crude rubber or gum so that it is thoroughly coated and the two sides are caused to adhere closely together.

In Fig. 8 the metal core is formed of a plurality of layers of wire gauze 1ª. When the layers of wire gauze are used for the reinforcing core the gauze is first preferably coated with soft rubber or "friction" and is then laid around, one layer over the other, until a ring of the proper size and thickness is formed. The various layers are caused to adhere by reason of the coating of gum or friction. Around this inner reinforcing metal ring is folded or lapped a covering 2 of fabric, preferably cotton duck. This wrapping or covering is coated on both sides with gum or friction so that it will adhere to the metal ring and the overlapping edges of it will stick together. Outside of this canvas or duck wrapping is placed a second wrapping or envelop 3 formed of uncured gum of the proper thickness and of the proper composition. I preferably mix with the gum of this layer long-fiber asbestos in order to make the said layer tough and to prevent it sticking or adhering to metal parts when the gaskets are in use. The gum is wrapped around the canvas-covered ring, the overlapping edges of the gum strip sticking together as shown in Figs. 2, 3 and 5.

When the gasket is made up as heretofore described it is in what might be termed a raw state. The built-up gasket is then placed in a mold to properly shape it. While in the mold it is placed under pressure and subjected to considerable heat for the purpose of vulcanizing all of the rubber gum and thereby permanently curing it in its finished form. By wrapping the canvas covered ring with a strip of uncured gum and then curing or vulcanizing it, the gasket is provided with an outside flexible covering which is seamless and impervious to water and oil and which, when cured, will stand excessive heat. By protecting the canvas-wrapped metal ring with a rubber envelop the disintegration of the inner structure is prevented and, of course, the gasket is rendered much more durable. Another advantage of providing the outer coating of rubber is that the inner and outer marginal edges of the gasket are precisely alike and equally serviceable for sealing purposes. There is no break or seam or fold at either marginal edge of the gasket and the overlapping edge of the rubber jacket or covering is merged into the body of the rubber to such an extent as to form practically a seamless covering. The vulcanizing or curing of the outer jacket so unites the overlapping portions thereof as to make it a uniform, homogeneous, seamless envelop, and unites it permanently with the fabric wrapping, due to the rubber or gum of the outer covering uniting with the rubber coating on the fabric wrapping. The inner covering of canvas or duck thoroughly protects the wire gauze reinforcing core and not only holds it in place against lateral movement, but prevents the sharp ends of the wires perforating the outer rubber envelop. When using the tubular gauze reinforcement the danger of the ends of the wire perforating the gasket structure is practically eliminated, but when the layers of gauze are used the ends of the wires are thoroughly protected by the canvas covering.

Instead of using wire gauze as indicated in Figs. 2, 4 and 5, a central reinforcing ring 4 of soft lead may be employed, as shown in Fig. 3. With this form of inner structure the gasket may be bent into any desired form or shape and the lead will hold it and prevent it from returning to its normal circular condition. With a flexible resilient metal ring such as the copper wire gauze shown in Fig. 2 the ring will have a tendency to return to its normal position after being distorted or pulled out of its ring shape.

These gaskets are adapted to be made in various sizes and are used for hand-holes and manholes, and for various other purposes. It will, of course, be understood that they may be used in any place where a gasket may be desired.

What I claim is:

1. The method of making gaskets consisting in forming a metal ring, wrapping said ring with fabric coated with rubber gum, enveloping said wrapped ring in a sheet of uncured gum and then subjecting the doubly wrapped ring to pressure and heat to vulcanize or cure the gum and to form the outer wrapping into a homogeneous seamless covering.

2. A gasket formed of an inner metallic ring, a wrapping of fabric and rubber around said ring and a seamless envelop of gum around said fabric-wrapped ring and united permanently with the rubber and fabric wrapping.

3. A gasket comprising a reinforcing ring formed of wire gauze, a covering of fabric and rubber for said reinforcing ring and a seamless covering of gum or rubber for said fabric-wrapped ring.

4. A gasket comprising a thin flat reinforcing ring formed of fine flexible wire, a covering of fabric for said reinforcing ring, and a seamless covering of gum or rubber for said fabric-wrapped ring and united permanently with the fabric wrapping.

5. A gasket comprising a reinforcing ring formed of flat tubular wire gauze, a covering of fabric for said reinforcing ring, and a seamless covering of gum or rubber for said fabric-wrapped ring.

6. A gasket comprising a reinforcing ring formed of flat tubular wire gauze, the ends of said ring being telescoped, a filling or coating of gum for said wire gauze ring, a wrapping of rubber-coated fabric for said reinforcing ring, and a seamless covering of gum or rubber for said fabric-wrapped ring.

In testimony whereof I hereunto affix my signature.

CHARLES I. E. MASTIN.